United States Patent
Mueller et al.

(10) Patent No.: US 6,222,915 B1
(45) Date of Patent: *Apr. 24, 2001

(54) METHOD FOR PROVIDING TELECOMMUNICATIONS-BASED SERVICES

(75) Inventors: Christel Mueller, Schulzendorf; Marian Trinkel, Huertgenwald; Thomas Ziern, Zepernik; Fred Runge, Wuensdorf; Romeo Peter Wetzel, Stuttgart, all of (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,404

(22) Filed: Mar. 17, 1999

(30) Foreign Application Priority Data

Mar. 18, 1998 (DE) .............................. 198 12 897

(51) Int. Cl.⁷ .................................................. H04M 17/00
(52) U.S. Cl. .......................... 379/144; 379/114; 379/121; 379/143; 455/406
(58) Field of Search ..................... 379/111, 114, 379/115, 118, 120, 121, 123, 127, 130, 140, 143, 91.01, 91.02, 201, 207, 243, 245; 455/553, 557, 558, 405, 406, 407, 408

(56) References Cited

U.S. PATENT DOCUMENTS 5,621,787 * 4/1997 McKoy et al. ........................ 379/144
6,118,860 * 9/2000 Hillson et al. ....................... 379/155

FOREIGN PATENT DOCUMENTS

WO97/22217 * 6/1997 (WO) .............................. H04Q/7/22

* cited by examiner

Primary Examiner—Huyen Le
Assistant Examiner—Binh K. Tieu
(74) Attorney, Agent, or Firm—Kenyon & Kenyon

(57) ABSTRACT

One variant from a large number of possible services and/or service combinations is made available to the customer via a dialogue of human-machine interaction: a variant which the customer needs to solve his/her problem or to comply with his/her service request. In the process, it is checked whether the customer has access to the terminal configuration required for this variant and verified that the customer's terminal configuration supports the service and/or service combination concerned. For the customer's access to the calling card service, cards of completely different types, personal phone card, prepaid card, "call home" card, etc., are admitted. The type of calling card defines the customer's access authorization to the various possible services and/or service combinations, as well as the manner of billing those services. The present invention is suited for increasing the degree of automation of the services offered by calling card providers.

9 Claims, 1 Drawing Sheet

METHOD FOR PROVIDING TELECOMMUNICATIONS-BASED SERVICES

FIELD OF THE INVENTION

The method according to the present invention relates to the provision of telecommunications-based services rendered via calling card systems in accordance with requests for the services by the customers.

RELATED TECHNOLOGY

In contrast to chip-based telephone cards and credit card solutions, calling card systems, described, e.g., in "Calling Card Features and Technical Implementation", Telekom. Praxis [Telecommunications Practice] 12/97, pages 17–27, typically do not require any actual plastic cards for proper functioning. The calling card system works on the basis of numeric strings which include a card number (PAN) and a personal identification number (PIN) and which, for instance, can be keyed in from memory at any touch-tone telephone. With the aid of the numeric string, the telephone customer identifies himself/herself in the database of the system computer as an authorized user of the system. Calling card services for the first time allowed cashless calls to be made at one's own expense from any telephone all over the world, just as if one were dialing from his or her home telephone. Fundamental and independent service functions of a calling card system can be classified as follows:

a) making cashless phone calls on a worldwide basis using personal user codes (PAN and PIN), and by an individual debiting of charges to the corresponding customer card account;

b) making cashless phone calls on a worldwide basis and using an amount of money previously stored in the system (prepaid calling);

c) making cashless phone calls worldwide by using main cards and secondary cards (corporate cards) and by cost assignment to fixed cost sections (cost-section calling);

d) making cashless phone calls worldwide for young people using the "call home" function (family calling card system); and e) providing service functionalities, such as electronic telephone mailbox (voice mail function).

These individual services typically are regarded as services that are independent of each other and can, therefore, be offered to the customer as single services only. As such, the configuration of the customer's terminal equipment, for example a phone, is not taken into consideration. For voice-controlled systems (such as voice-activated telephone-based system), interactive communication between the customer and the calling card system is restricted to a few single control words in a language. Conversions, for example converting voice to writing (subsequently output, for example, per fax), are not yet possible with known presently-used methods. All existing services have been implemented on closed, individually assigned platforms, which do not permit any expansion in the form of new services or any new ways of conversion.

SUMMARY OF THE INVENTION

The present invention provides a method for a calling card system which allows the customer a diversified and expandable access to telecommunications-based services, especially in the case of complex service requests. Starting out from a customer's request for services, the aim of the calling card system of the present invention is to successively offer the customer all service components which the user needs to fulfill his or her service request. This can occur in a single telephone call. In addition, a customer authorization control and a plausibility check are to be performed before the requested service is provided.

The present invention provides a method for providing telecommunications-based services, where the access to the service provider is realized, on the basis of cards, via a calling card provider. The user interface between the telecommunications terminal of the customer and the various calling card services of the calling card provider is effected over information input/output modules. The customer—after having dialed the call number/service number of the calling card service—is connected, via a module "telephone interface with calling line identification (Caller ID)", to the information input/output modules, and interactive communication with the customer is started via the information input/output modules. The method is characterized in:

that after recognition of a first valid information input from the customer, a connection is set up via a control module to a database in which data on the types of calling cards approved within the scope of services offered by the calling card service, including the access authorization (PAN and PIN) to the calling cards and to the services admitted for the type of card concerned, are stored and logically interconnected;

that the customer is prompted, via the information input/output module, to input data required to identify the customer to the calling card service, in accordance with the calling card used;

that the customer, after having been successfully identified, is prompted, via the information input/output module, to input the information about the service requested by him/her;—that based on the PAN of the customer's calling card, it is checked whether the service requested by the customer is admissible in connection with the calling card used by him/her;

that if the service requested by the customer is permitted, appropriate services and/or service combinations in conjunction with suitable information input and output media are determined via a second database in order to fulfill the customer's service request, the second database containing data on services and/or service combinations which are logically interconnected with a conversion matrix containing known information input and output media and all combinations of information input and output media which can be derived from the information input and output media known, including the configurations of terminal equipment relating to the services and/or the service combinations;

that the services and/or service combinations, ascertained on the basis of the customer's service request, in conjunction with the information input and output media determined in this respect, are subject to a plausibility check to verify whether the desired service and/or the requested service combination is supported by the information input/output module available at the customer and the calling card of the customer, whether the desired service and/or the requested service combination is suitable for solving the customer's problem, and whether the desired service and/or service combination is admitted within the scope of the calling card system, that a) in the event of the plausibility check yielding a negative result, a decision feedback is transmitted to the information input/output module, which outputs stored information about the problem that has occurred to the customer, and that the customer is prompted to correct the data pertaining to his/her service request, and that b) in the event of a successful plausibility check, the service and/or service combination required for solving the customer's problem is generated and automatically connected through to the customer and is, thus, made available to the customer to meet his/her service request.

BRIEF DESCRIPTION OF THE DRAWING

The present invention is presented in more detail with reference to the following drawing, in which.

DETAILED DESCRIPTION

Figure 1:
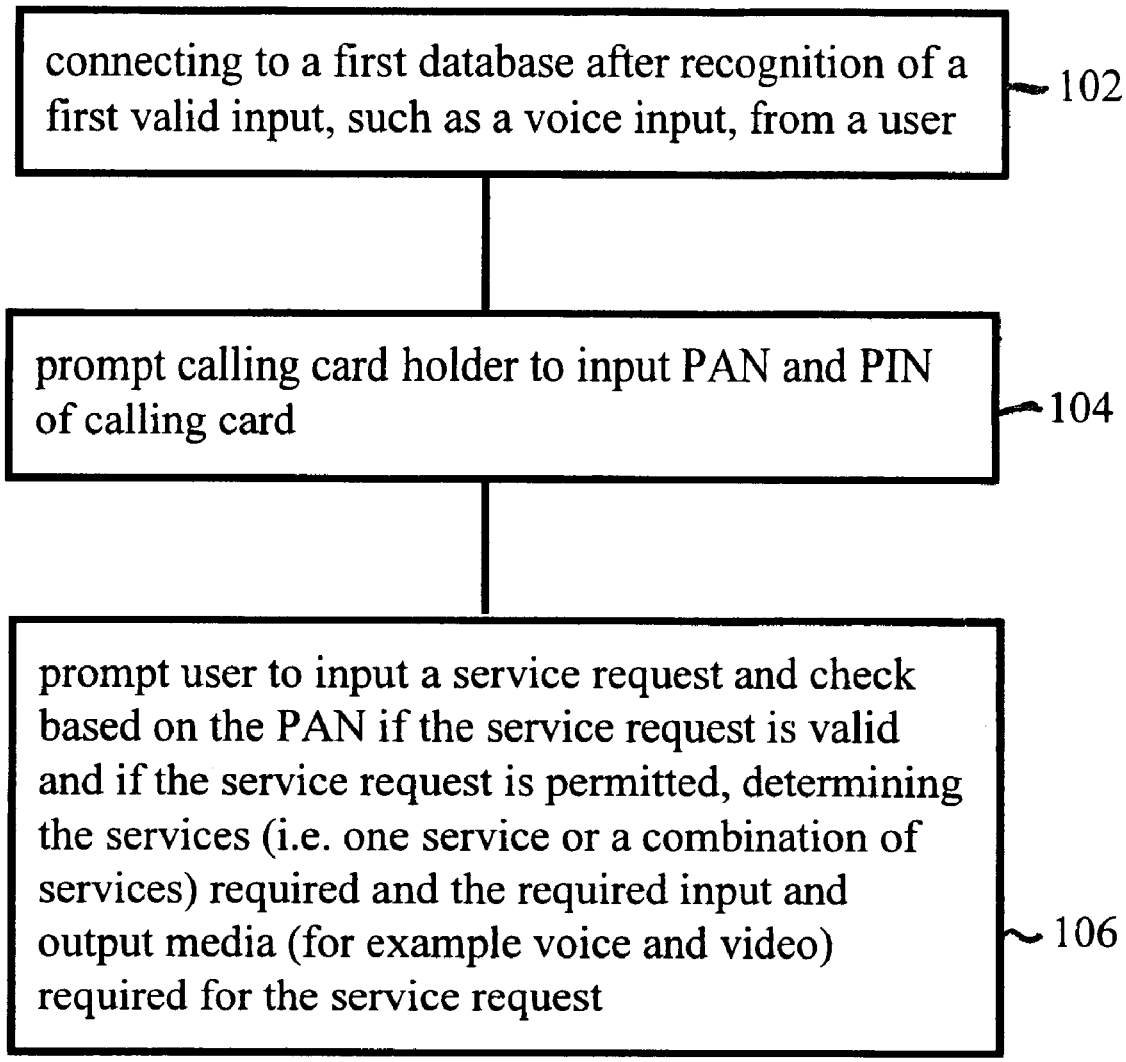
FIG. 1 shows a flowchart of the method according to the present invention.

As shown in FIG. 1, in accordance with the present invention, once a customer places a call and a connection is established from the telecommunications terminal of the customer to a calling card service, and once a first valid customer information input via a control module is recognized, a connection is set up to a database (step 102), in which data on the types of calling cards approved within the scope of the services offered by the calling card service, including the access authorization (PAN and PIN) to the calling cards and to the services admitted for the type of card concerned, are stored and logically interconnected. Via the information input/output module of the calling card service, the customer is prompted to input data (step 104), such as PAN and PIN, required for his/her identification in connection with the calling card used by him/her. After the customer is successfully identified to the calling card service, the customer is prompted, via the information input/output module, to input information about the service and/or services requested by him/her. (Step 106)

In a second, subordinate database, it is checked, on the basis of the PAN, whether the service requested by the customer is permissible in connection with the calling card used by him/her. If the service requested by the customer is permitted, appropriate services and/or service combinations, as well as the associated information input and output media are determined in order to fulfill the customer's service request. This is effected via a database in which data on services and/or service combinations are stored that are logically interconnected with stored data on information input and output media and combinations of information input and output media which can be derived therefrom. Information input and output media are understood to be voice, data, video and audio, to which type-specific terminals are assigned that support these information input and output media.

The services and/or service combinations ascertained on the basis of the customer's request for an overall service, together with the relevant information input and output media, are subject to a plausibility check, where an evaluation logic aids in verifying whether the desired service and/or the requested combination of services is supported by the information input/output module available at the customer and the customer's calling card, whether the desired service and/or the requested service combination is the best one for solving the customer's problem, and whether the desired service and/or service combination is permitted within the framework of the calling card service.

In the event of the plausibility check yielding a negative result, a decision feedback is transmitted to the information input/output module, which outputs to the customer stored information about the problem that occurred. On the basis of this information, the customer is prompted to correct the data pertaining to his/her service request.

In the event of a successfully concluded plausibility check, the service and/or the service combination required for solving the customer's problem is generated and automatically connected through to the customer. By using the service and/or the service combination provided to the customer, in conjunction with the configuration of terminals available to him/her, the customer is able to fulfill his/her service request.

The method according to the present invention is elucidated on the basis of an exemplary embodiment of a calling card service which is based on a voice-controlled, human-machine user interface. According to this embodiment, a customer, who has a personal phone card, would like to use a service to know (i.e. look up) a phone number and then have a communication established to this phone number. The personal phone card is a card that is related to a specific person, and which is used by that person to transfer his/her personal data, along with a valid account number, to the system, to generate a parent record. A PAN is assigned to the customer as a customer address, as well as a PIN which allows the customer to identify himself/herself to the calling card system.

After the service call number of a calling card provider has been dialed and the connection to the service center of the calling card provider established, the customer is connected, via the "telephone interface with calling line identification (Caller ID)" module, to an information input/outut module, which is designed as a voice recognition/voice output module and works according to the principle of user-independent voice recognition.

Once the calling line identification (caller ID) defining the telecommunications terminal from where the customer is calling is ascertained, following recognition of a first valid customer voice input, the first database is activated. The first database stores and logically interconnects data from various calling card types, including the data services and/or data service combinations permitted for the type of card involved, as well as the access authorization, e.g. PAN and PIN, to the calling cards. It is noted here that a PIN is only needed for calling cards relating to specific persons.

Via the voice recognition/voice output module, the customer is prompted to indicate the data required for identifying his/her Pacific calling card and for identifying his/her access authorization, such as PAN and PIN or PAN only. The card number PAN represents the customer address in the system. It is also the customer's identification to the calling card system and authorizes the customer to dial into the calling card service. The customer uses the PIN to verify, prior to each usage, that only he or she is entitled to the service requested. After successful verification of the calling card data and, thus, authorization of the customer, the customer is queried about other telecommunications terminals available to him/her, besides the telephone, e.g. fax machine, display phone or computer for e-mails, etc., as well as about his/her service request. Via the voice recognition/voice output module, the customer inputs that he/she seeks a certain phone number and would like to be connected to that phone number. It is then checked, based on the PAN of the calling card already known to the system, whether the customer's service request is admissible.

After successful verification, a second database is activated. The second database is used as a database for a search routine. This second database contains a logic matrix in which all possible data services/other services, such as absent-subscriber services, telephone services, directory information services and translation services, are logically interconnected and linked to a conversion matrix containing possible input and output media or combinations of input and output media for the above-mentioned data services. On the basis of the customer's service request, a search routine is used to determine the data services/other services, as well as the input and output media (for example, voice and video) suited or required for fulfilling the customer's service request. In this context, the conversion matrix for the input and output media is structured in such a way that it contains all known input and output media and that it allows all combinations of information input and output media possible within the scope of the data services and the combination of data services to be converted with the terminal configurations supporting it. This means that the conversion also may include combinations which have not yet been implemented technically.

Accordingly, this matrix provides a method which takes into account a possible number- of future service combinations and information input and output media suitable for those services.

For active operation, it is expedient to restrict the possible admissible combinations to a number that conforms with the services actually offered by the calling card system-possible permissible combinations can be ascertained according to the following search criteria:

Which combinations are possible within the framework of the admissible calling cards? Which combinations are requested by the customers and/or are useful for the customers?

Which possible combinations are hardware-supported?

Based on the customer's request or on problems arising therefrom, the service and/or the combination of services required to comply with the request and/or to solve the problem posed, is ascertained in conjunction with the possible information input and output media, by using the data from the database structured according to the abovementioned principle, and is then subject to a plausibility check. In the process, it is checked whether the requested service, together with the input and output media determined, is suitable for solving the customer's problem, taking into consideration the configuration of terminals available at the customer's site. Such a plausibility check is particularly advantageous when solving a problem entails interconnecting several services to fashion a service combination. In this case, the combination chosen is subject to another plausibility check, which verifies whether the selected combination is permissible by comparing the stored and approved services and service combinations to the input and output media admissible therefor.

At If the problem posed is found to be invalid or an invalid combination of data services is identified, a decision feedback is sent to the voice recognition/voice output module. Via the voice recognition/voice output module, the customer receives the voice response of a fault message stored for the problem encountered. In this voice response, the customer is prompted to correct the data pertaining to his/her problem.

In the event of a successful plausibility check, the service needed to solve the customer's problem and/or the required service combination which was determined from a comparison with the stored data pertaining to the customer's problem, is generated and automatically connected through to the customer. The service and/or the service combination that the customer needs to fulfill his/her service request is made available to the customer as a service that is ready to be queried. Since the customer, as described in the example above, wants to know a certain phone number, he/she is automatically connected to a call information service, e.g. a directory assistance service. After being given the phone number by the directory assistance, the calling card provider exchange again resumes servicing the customer and connecting him/her to the telephone station concerned. This is feasible because the requested phone number is returned in the manner of a three-party conversation between the directory assistance and the customer and calling card service. The phone number issued by the directory assistance is received in the system of the calling card service as voice information, evaluated with the help of voice recognition, converted to a numeric string and automatically entered in the database of the switching service for the customer as the desired B-call number for the customer. Subsequently, a connection to the requested B subscriber is automatically set up and the state of subscriber B announced to the customer and/or the connection between the customer and the requested B subscriber established.

After the desired service and/or service combination is used, the charges incurred for use of the service are debited from the balance of the customer's calling card, e.g. from the balance of a personal phone card. The method according to the present invention is so conceived that, in the event of operating difficulties arising from the interaction with the machine, switch-over to an operator is envisaged. For this purpose, automatic switch-over facilities are provided at different points in the customer-machine interaction. Switchovers are always activated if the computer does not receive the queried data at all or in time, or if it receives them in an incorrect form. In parallel with the connection to the customer, all data essential for the communication with the customer, such as card number, destination call number, are indicated to the operator on his/her screen.

An advantage of the method according to the present invention is that from the large number of possible services and/or service combinations, the customer is provided, via a search routine, with the service or service combination which he/she needs to solve his/her problem and/or to fulfill his/her service request. In this context, it is checked whether the customer has access to the terminal configuration required for the service and/or service combination, and it is verified that the customer's terminal configuration supports this service and/or service combination. According to the present invention, cards of different types, such as personal phone card, prepaid phone card, "call home" card, are admitted for the customer's access to the calling card service. In this context, the type of calling card defines, among other things, the customer's access authorization to the various possible services or service combinations and the manner of billing those services.

The method of the present invention is suited for increasing the degree of .automation of the services offered by calling card providers. It is advantageous to the customer that particularly in the case of a complex, overall service request involving several service components, the customer is successively provided in one session with all services and/or service combinations required for fulfilling his/her service request.

What is claimed is:

1. A method for providing a plurality of telecommunications-based services to a user having at least one calling card by a calling card provider having a provider call number, the method comprising the steps of:

connecting the user via an information input/output module to the calling card provider upon dialing the provider call number;

setting up a connection to a first database after recognition of a first valid information input from the user, the first database storing and logically interconnecting calling card access information and valid services of the at least one card;

prompting the user via the information input/output module to input data required to identify the at least one calling card to the calling card provider;

prompting the user after successful identification via the information input/output module to input information about a service request;

checking based on a PAN of the at least one calling card whether the service request is permissible for a type of the at least one calling card; and if the service request is permitted, determining the services required for the service request and determining required information input and output media for the service request via a second database, the second database logically interconnecting data on available services, known information input and output media, and terminal equipment types.

2. The method as recited in claim I further comprising subjecting the service request to a plausibility check to verify whether the services required are supported by user information input/output modules available to the user; and if the plausibility check is negative, prompting the user to correct data pertaining to the service request, and if the plausibility check is affirmative, providing the services required to the user.

3. The method according to claim I wherein user communication with the calling card provider is performed as human-machine dialogue via the information input/output module, the information input/output module being a voice recognition/voice output module.

4. The method according to claim I wherein user communication with the calling card provider is performed by the exchange of alphanumeric control characters.

5. The method according to claim 1 further comprising automatically connecting the user to an operator in case of problems arising during a user-machine communication, the operator simultaneously receiving user data displayed on an operator monitor.

6. The method according to claim 1 further comprising prompting the user to provide information on terminal equipment types available to the user.

7. The method as recited in claim I further comprising identifying the user through caller ID.

8. The method as recited in claim 1 wherein the first valid information input of the user is a voice input.

9. A method for providing a plurality of telecommunications-based services to a user having a first calling card for a first service and a second calling card for a second service of the services, a provider of one of the first and second calling cards having a provider call number, the method comprising the steps of:

connecting the user to the calling card provider upon dialing the provider call number;

setting up a connection to a first database after recognition of a first valid information input from the user, the first database storing and logically interconnecting calling card access information and first valid services of the first calling card and second valid services of the second calling card;

prompting the user to input data required to identify either the first or second calling card as the primary calling card to the calling card provider;

prompting the user to input information about a service request;

checking based on a PAN of the primary calling card whether the service request is permissible for the primary calling card; and if the service request is permitted, determining the services required for the service request and determining required information input and output media for the service request via a second database, the second database logically interconnecting data on available services, known information input and output media, and terminal equipment types.

* * * * *

UNITED STATES PATENT AND TRADEMARK OFFICE
CERTIFICATE OF CORRECTION

PATENT NO. : 6,222,915 B1
DATED : April 24, 2001
INVENTOR(S) : Christel Mueller et al.

It is certified that error appears in the above-identified patent and that said Letters Patent is hereby corrected as shown below:

Column 5,
Line 57, change "At If" to -- If --

Column 6,
Line 58, change ".automation" to -- automation --

Column 7,
Lines 28, 36 and 41, change "I" to -- 1 --

Column 8,
Line 9, change "I" to -- 1 --

Signed and Sealed this

Ninth Day of April, 2002

Attest:

JAMES E. ROGAN
*Director of the United States Patent and Trademark Office*

*Attesting Officer*